(12) United States Patent
Noyes et al.

(10) Patent No.: US 11,687,316 B2
(45) Date of Patent: Jun. 27, 2023

(54) AUDIO BASED IMAGE CAPTURE SETTINGS

(71) Applicant: QUALCOMM Incorporated, San Diego, CA (US)

(72) Inventors: Ying Noyes, San Diego, CA (US); Ho Sang Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/802,984

(22) Filed: Feb. 27, 2020

(65) Prior Publication Data

US 2020/0278833 A1 Sep. 3, 2020

Related U.S. Application Data

(60) Provisional application No. 62/811,838, filed on Feb. 28, 2019.

(51) Int. Cl.
| | |
|---|---|
| *H04N 23/60* | (2023.01) |
| *G06F 3/16* | (2006.01) |
| *H04N 9/31* | (2006.01) |
| *G10L 15/183* | (2013.01) |
| *H04N 23/61* | (2023.01) |
| *H04N 23/70* | (2023.01) |

(52) U.S. Cl.
CPC ............ *G06F 3/167* (2013.01); *G10L 15/183* (2013.01); *H04N 9/3182* (2013.01); *H04N 23/60* (2023.01); *H04N 23/61* (2023.01); *H04N 23/70* (2023.01)

(58) Field of Classification Search
CPC ........... H04N 5/23216; H04N 5/23222; H04N 23/61; H04N 23/64; H04N 23/70; H04N 9/3182; G10L 15/18; G10L 15/22; G10L 15/183; G06F 3/167
See application file for complete search history.

(56) References Cited

U.S. PATENT DOCUMENTS

| | | | |
|---|---|---|---|
| 7,697,827 B2 | 4/2010 | Konicek | |
| 8,478,587 B2 | 7/2013 | Kawamura et al. | |
| 8,665,340 B2* | 3/2014 | Prentice | ........... H04N 5/232933 |
| | | | 348/222.1 |
| 9,667,859 B1 | 5/2017 | Matias et al. | |
| 9,892,514 B2* | 2/2018 | Maguire | .................. H04N 1/00 |
| 9,918,006 B2* | 3/2018 | De Bayser | .............. G06F 3/167 |
| 10,270,962 B1 | 4/2019 | Stout | |

(Continued)

OTHER PUBLICATIONS

Camberidge in Colour, "Camera Exposure," Feb. 16, 2015, Available https://web.archive.org/web/20150216221544/https://www.cambridgeincolour.com/tutorials/camera-exposure.htm (Year: 2015).*

(Continued)

*Primary Examiner* — Alvin H Tan
(74) *Attorney, Agent, or Firm* — Polsinelli/Qualcomm

(57) ABSTRACT

Methods, devices, and systems for determining image capture settings based on an audio input are disclosed. In some aspects, a device includes a memory, a camera including a lens and a sensor, and a processor coupled to the camera and the memory. The processor may be configured to receive an audio input, determine contextual information based on the audio input, determine one or more image capture settings based on the contextual information, and output the one or more image capture settings.

57 Claims, 8 Drawing Sheets

(56) References Cited

U.S. PATENT DOCUMENTS

| | | | |
|---|---|---|---|
| 10,360,910 B2* | 7/2019 | Valentine | G10L 15/22 |
| 10,496,705 B1* | 12/2019 | Irani | G06F 16/90328 |
| 10,506,172 B2* | 12/2019 | Welker | G06V 20/20 |
| 2005/0118990 A1 | 6/2005 | Stephens | |
| 2008/0095434 A1* | 4/2008 | Funayama | H04N 21/6547 |
| | | | 382/172 |
| 2012/0019687 A1* | 1/2012 | Razavi | H04N 25/42 |
| | | | 348/231.6 |
| 2013/0342713 A1 | 12/2013 | Cui | |
| 2014/0267799 A1 | 9/2014 | Sadasivam et al. | |

OTHER PUBLICATIONS

International Search Report and Written Opinion—PCT/US2020/020380—ISA/EPO—dated Jun. 8, 2020.

* cited by examiner

//h1 AUDIO BASED IMAGE CAPTURE SETTINGS

CLAIM OF PRIORITY

The present application for patent claims priority to U.S. Provisional Patent Application No. 62/811,838, entitled "AUDIO BASED IMAGE CAPTURE SETTINGS," filed Feb. 28, 2019, assigned to the assignee hereof.

TECHNICAL FIELD

This disclosure generally relates to image capture settings, and more particularly, to techniques for determining image capture settings based on audio inputs.

BACKGROUND

Many electronic devices, such as smartphones, laptops, tablets, home security systems, automobiles, drones, and aircrafts, use one or more cameras to capture images and video. The one or more cameras may determine one or more image capture settings, such as an exposure setting for image brightness, a white balance gain so the colors of the image appear the same in the image as they would in the real world, and/or a lens position for correct focus. One or more processors may use the image capture settings for capturing and/or processing one or more frames and/or images. Determining and/or estimating image capture settings is a time consuming process because small adjustments to the image capture settings are applied in real time until a final determination is made. The delay in determining the image capture settings can be frustrating to a user because it may result in missed scenes or moments that passed while the device was determining the image capture settings. It is desirable to improve the speed and accuracy of determining image capture settings.

SUMMARY OF THE INVENTION

Aspects of the present disclosure are directed to methods and devices for audio based image capture settings. In one aspect a device may include a memory, a camera including a lens and a sensor, and a processor coupled to the camera and the memory. The processor may be configured to receive an audio input. The processor may be configured to determine contextual information based on the audio input. The processor may be configured to determine one or more image capture settings based on the contextual information. The processor may be configured to output the one or more image capture settings. The processor may be configured to cause the camera to capture an image using the one or more image capture settings.

In some aspects, the contextual information may include context associated with an environment the device is in. In some aspects, the contextual information may include one or more lighting conditions associated with an environment. In some aspects, the contextual information may include metadata associated with a current state of the device. In some aspects, the contextual information may include one or more keywords identified in the audio input.

In some aspects, the one or more image capture settings may include at least one of a white balance gain, one or more exposure settings, and a lens position.

Determining the one or more image capture settings may include determining the white balance gain. Determining the white balance gain may include determining current statistics associated with a current frame and determining the white balance gain based on the current statistics and one or more of the audio input and the contextual information.

In some aspects, outputting the one or more image capture settings may include applying the white balance gain to one or more subsequent frames. In some aspects, the processor may be configured to output the one or more subsequent frames with the applied white balance gain for display.

In some aspects, determining the one or more image capture settings may include determining the one or more exposure settings. Determining the one or more exposure settings may include determining current statistics associated with a current frame, determining a current sensor gain associated with the current frame, determining a current digital gain associated with the current frame, determining a current exposure time associated with the current frame, and determining the one or more exposure settings based on the current statistics, the current sensor gain, the current digital gain, the current exposure time, and one or more of the audio input and the contextual information. Determining the one or more exposure settings may include at least one of determining a subsequent sensor gain, determining a subsequent digital gain, and determining a subsequent exposure time.

In some aspects, outputting the one or more image capture settings may include applying the one or more exposure settings. Applying the one or more exposure settings may include at least one of applying the subsequent sensor gain when capturing one or more subsequent frames, applying the subsequent digital gain to the one or more subsequent frames, and applying the subsequent exposure time when capturing the one or more subsequent frames. In some aspects, the processor may be configured to output the one or more subsequent frames with the applied one or more exposure settings for display.

In some aspects, determining the one or more image capture settings may include determining the lens position based on one or more of the audio input and the contextual information. In some aspects, the processor may be configured to cause the camera to move a lens of the camera from a current lens position to the determined lens position. In some aspects, the lens position is an initial lens position.

In some aspects, the audio input and the contextual information may be stored in the memory for a period of time. Determining the one or more image capture settings based on the audio input may include determining the one or more image capture settings upon initialization of a camera application based on the audio input stored in the memory for the period of time. Determining the one or more image capture settings upon initialization of the camera application may include determining a white balance gain based on the audio input. Determining the one or more image capture settings upon initialization of the camera application may include determining one or more exposure settings based on the audio input. Determining the one or more image capture settings upon initialization of the camera application may include determining an initial lens position based on the audio input.

In some aspects, the device may include a display. In some aspects, the device may include a microphone.

In one example of the disclosure, a method may include receiving an audio input, determining one or more image capture settings based on the audio input, and outputting the one or more image capture settings.

In another example, this disclosure describes a non-transitory computer-readable storage medium storing instructions that, when executed, causes one or more processors to receive an audio input, determine contextual information based on the audio input, determine one or more image capture settings based on the contextual information, and output the one or more image capture settings.

In a further aspect, a device is disclosed. The device may include means for receiving an audio input, means for determining contextual information based on the audio input, means for determining one or more image capture settings based on the contextual information, and means for outputting the one or more image capture settings.

The details of one or more examples are set forth in the accompanying drawings and the description below. Other features, objects, and advantages will be apparent from the description, drawings, and claims.

DETAILED DESCRIPTION

Figure 1A:
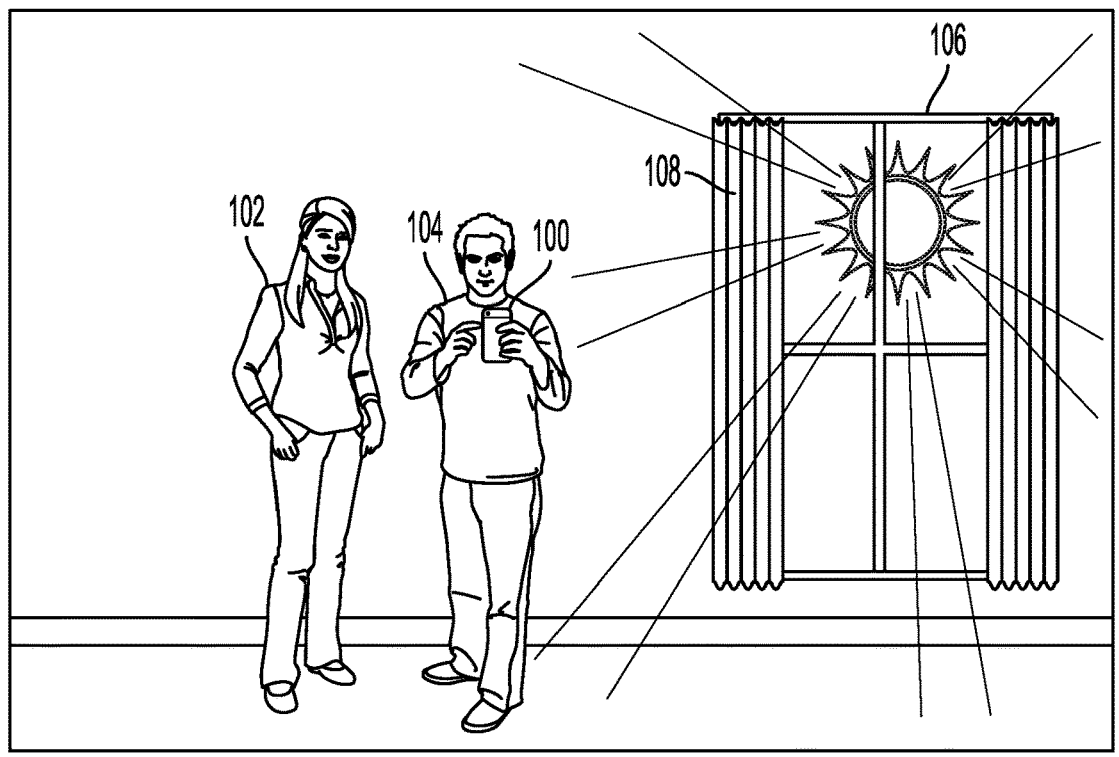
FIGS. 1A-1B depict example environments of a device.

Aspects of this disclosure, as will be described in further detail below, may include receiving an audio input, determining one or more image capture settings based on the audio input, and outputting the one or more image capture settings to one or more frames.

Electronic devices may include voice recognition functionality that can provide a variety of features and/or services in response to an audio input (e.g., spoken words and/or commands). Electronic devices that include intelligent automated assistants (e.g., virtual assistants), for example, allow users to interact with the electronic device using natural language in spoken form. For example, a user can access functionality of an electronic device by providing a spoken audio input in natural language form to a virtual assistant associated with the electronic device. One or more processors of the electronic device may perform natural language processing on the spoken audio input to interpret tasks or commands. The tasks may then be performed by executing one or more functions of the electronic device.

Virtual assistant interactions may be triggered in a variety of ways. In one example, a virtual assistant session may be initiated in response to detecting a spoken trigger. For example, the electronic device can listen for a trigger word or phrase such as "Assistant," "Hey Assistant," "Hi Assistant," "Helper," "Secretary," or the like. Alternatively, the spoken trigger word or phrase can include commands, actions, queries, or other actionable words or phrases. For example, certain commands or questions can be used as spoken triggers to initiate actions (e.g., executing the associated commands or responding to questions). In some examples, application or program names may be used as spoken triggers to launch those applications. A user can say, for example, "When is my next meeting," "What is the weather," "What time is it," "Launch the camera application," "Camera," "Email," "Play music," "Flashlight," or any of a variety of other application names, phrases, and/or commands that can be recognized as spoken triggers to launch an application, execute a command, and/or respond to a query. In some examples, launching some applications, executing some commands, and/or responding to some queries may be done without fully initiating a session with a virtual assistant (e.g., without explicitly interacting with a virtual assistant by saying "Assistant" or the like prior to saying the application name, command and/or query.

As described above, it is understood that a variety of words, phrases, actions, commands, queries, and/or combinations thereof may be used as spoken triggers. The spoken triggers may vary based on user preferences, devices, and/or manufacturers. Because the spoken triggers may be spoken at any time, the electronic device must always be receiving an audio input including sounds of its surrounding environment. The electronic device may process the audio input to determine whether any trigger words, phrases, commands, and/or queries are included within the audio input. Alternatively, the electronic device may transmit the audio input to a remote device for the remote device to process the audio input. The electronic device may then receive any identified trigger words, phrases, commands, and/or queries from the remote device. In other words, the electronic device is always receiving sounds of its surrounding environment via one or more microphones. For example, the electronic device may receive a conversation between people near the electronic device.

In some examples, the electronic device may use the received sounds (e.g., an audio input) of its surrounding environment to determine contextual information. In this way, the electronic device may receive audio inputs other than just spoken words, for example, music playing, street noise, birds chirping, etc. The contextual information may be supplemented with metadata by utilizing other sensors, subsystems, and/or peripheral devices. For example, the electronic device may include one or more sensors or subsystems, including, but not limited to, a motion sensor, a light sensor, a positioning system (e.g., a GPS receiver), a temperature sensor, a biometric sensor, a gyroscope, a compass, an accelerometer, and the like. Using any of the sensors, subsystems, or peripheral devices, the contextual information may include metadata and/or information associated with the physical state of the electronic device (e.g., date, time, device orientation, device location, device temperature, exterior temperature, power level, speed, acceleration, motion, cellular strength, etc.).

Since the electronic device is always listening and processing/analyzing the audio input including sounds of its surrounding environment, even if a trigger word, phrase, command, or query is not identified as part of the audio input, the audio input may include helpful contextual information, as discussed above. In some cases, the audio input and/or contextual information may be provided to a third party application. The third party application may use the audio input and/or contextual information to provide a more personalized, targeted user experience (e.g., tailor ads and marketing to newsfeeds, etc.).

This disclosure describes techniques for using at least a part of an audio input to determine one or more image capture settings. At least a part of the audio input may include sounds and/or one or more keywords. As used herein, keywords may be identified words in the audio input or may include words associated with contextual information determined based on the audio input (e.g., if bird are chirping, one example keyword may include "outside"). As will be discussed in further detail below, one or more image capture settings may be determined based on the audio input and/or the contextual information determined from the audio input.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

All of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "causing," "accessing," "receiving," "sending," "using," "selecting," "determining," "normalizing," "multiplying," "averaging," "monitoring," "comparing," "applying," "updating," "measuring," "deriving," "estimating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Also, the example devices may include components other than those shown, including well-known components such as a processor, memory, equivalents thereof, and the like. Aspects of the present disclosure are applicable to any suitable device (such as smartphones, tablets, laptop computers, digital cameras, web cameras, a security system, automobiles, drones, aircraft, and so on) having or coupled to one or more cameras. For multiple cameras, the cameras may include a primary camera and one or more auxiliary cameras with similar capabilities as the primary camera. For example, a device may include a dual camera module with two cameras. The camera(s) may be able to capture and process still images or video. While described below with respect to capturing and processing images, aspects of the present disclosure are applicable to capturing and processing video, and are therefore not limited to still images.

Figure 1B:
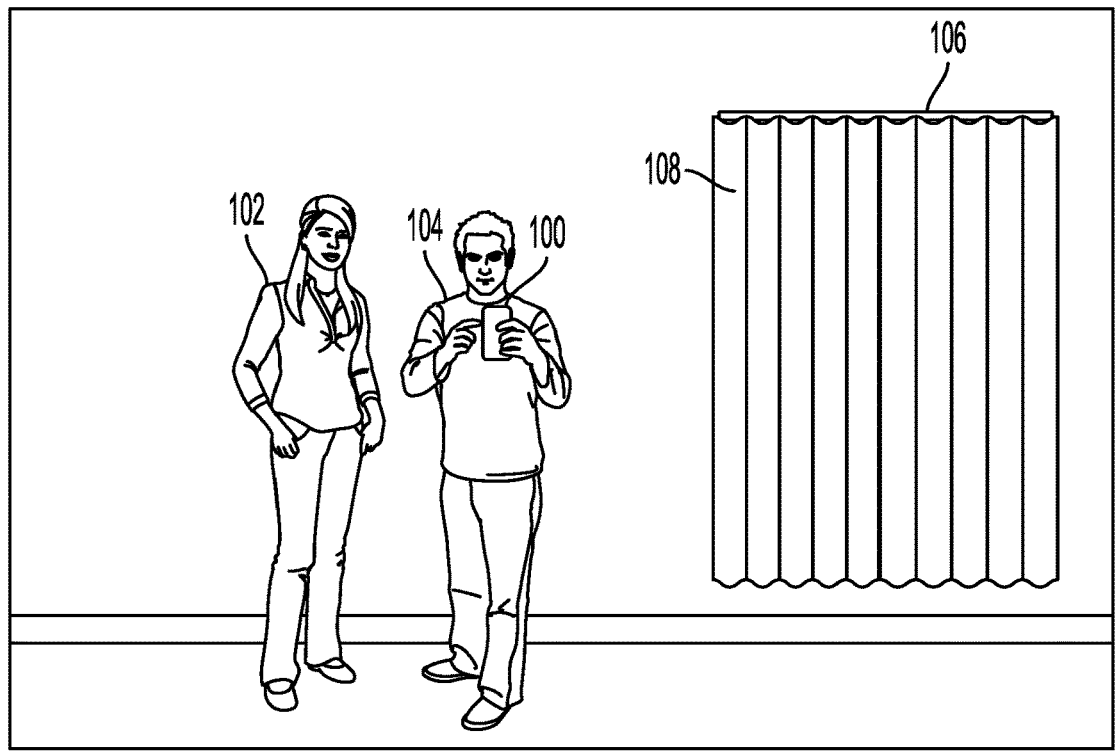

FIGS. 1A and 1B depict an example environment in which an electronic device is physically located. As shown in FIGS. 1A and 1B, two people 102, 104 may be in a room indoors. Electronic device 100 may be included within the room. The room includes at least one window 106 with curtains and/or blinds 108. The curtains and/or blinds 108 may be open, as depicted in FIG. 1A. Electronic device 100 (e.g., always-on listening device) may always be receiving audio inputs from its surrounding environment via one or more microphones (not shown). For example, the people 102, 104 in the room may be having a conversation, and person 102 may ask person 104 to close the curtains 108. Electronic device 100 may receive the audio input including the instruction to close the curtains.

In some examples, electronic device 100 may process the audio input to determine contextual information about the surrounding environment of the electronic device 100, including one or more lighting conditions of the environment. Alternatively, the electronic device 100 may transmit the audio input to a remote device and may receive the contextual information based on the audio input from the remote device. For example, one or more processors of electronic device 100 may receive the audio input including, at least, the words "close the curtains." The one or more processors may determine contextual information about the environment based on the words "close the curtain." For example, the contextual information associated with "close the curtains" may include a determination that the electronic device 100 is at least indoors and that after the curtains are closed, little to no daylight (if it is even daytime) will be entering the room via the window 106. Prior to closing the curtain, without further audio inputs, such as "it's bright in here" or "turn on the lights," electronic device 100 may not be able to determine current lighting conditions of the environment in the room with just "close the curtain." However, electronic device 100 may determine that in the near future, the curtains will close, and little to no natural sunlight will be entering the room. Thus, the lighting condition of the room will likely be an artificial light source (e.g., incandescent lighting, fluorescent lighting, etc.) or shade.

The contextual information may be supplemented with metadata and/or may be based upon the audio input and metadata. For example, electronic device 100 may determine its location in the real world (e.g., city, state, country, etc.), a current local time, and/or current weather condition in the location in order to determine further contextual information, such as whether it is day time, night time, sunny, cloudy, etc. Alternatively, electronic device 100 may receive this additional contextual information and/or metadata from a remote device. Continuing with the example above, if the curtains are currently open, and the electronic device determines that it is day time and sunny, then the contextual information may further include that the surrounding environment of electronic device 100 in FIG. 1A is indoors with bright, natural light. However, electronic device 100 may determine that, based on the audio input including "close the curtains," that the lighting conditions may change in the immediate future, such that the environment will have little to no natural light and will not be as bright.

As shown in FIG. 1B, the curtains 108 are now closed and little to no natural light is entering the room from window 106. Based on the audio input and/or the contextual information, electronic device 100 may determine one or more image capture settings for the camera of electronic device 100 for the environment of FIG. 1B. For example, the electronic device 100 may determine one or more exposure settings (e.g., shutter speed and/or exposure time, aperture size, sensor gain, digital gain, ISO setting, etc.), white balance (e.g., illuminant, white balance gains, etc.), and/or focus settings (e.g., lens position, etc.) based on the audio input and/or the contextual information (e.g., indoors and change in lighting conditions). This may result in faster focus, faster convergence speed for a target exposure level, and/or a faster and/or more accurate white balance determination.

Figure 2A:
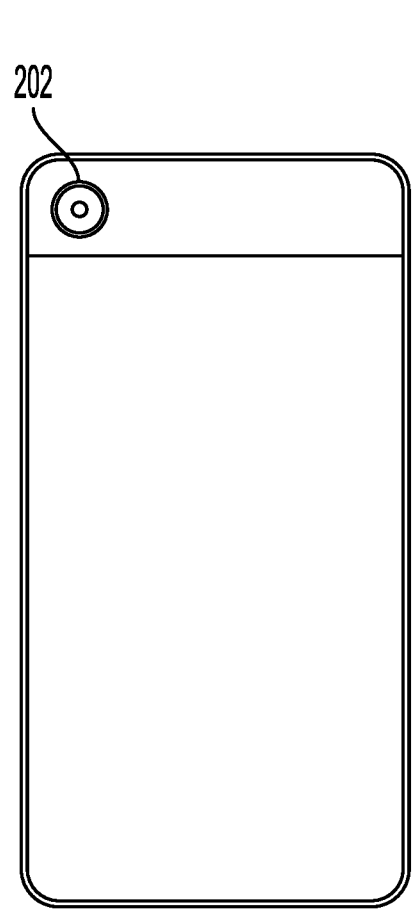
FIGS. 2A-2B depict examples of devices including a camera.
Figure 2B:
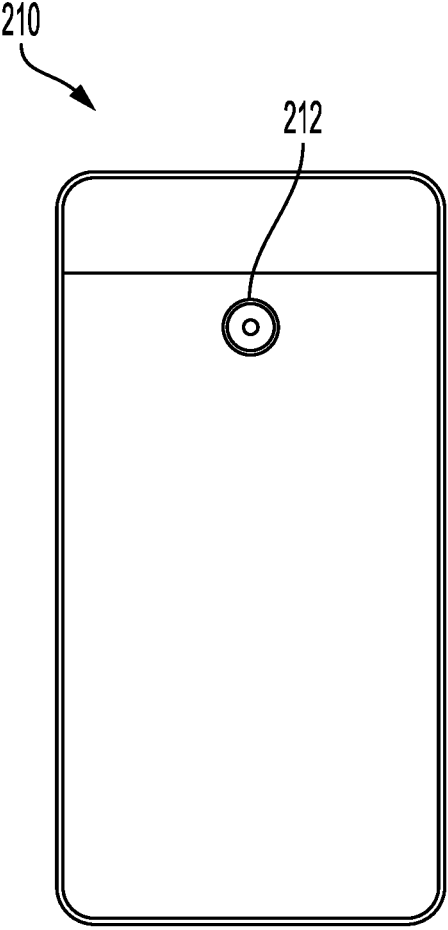
Figure 2C:
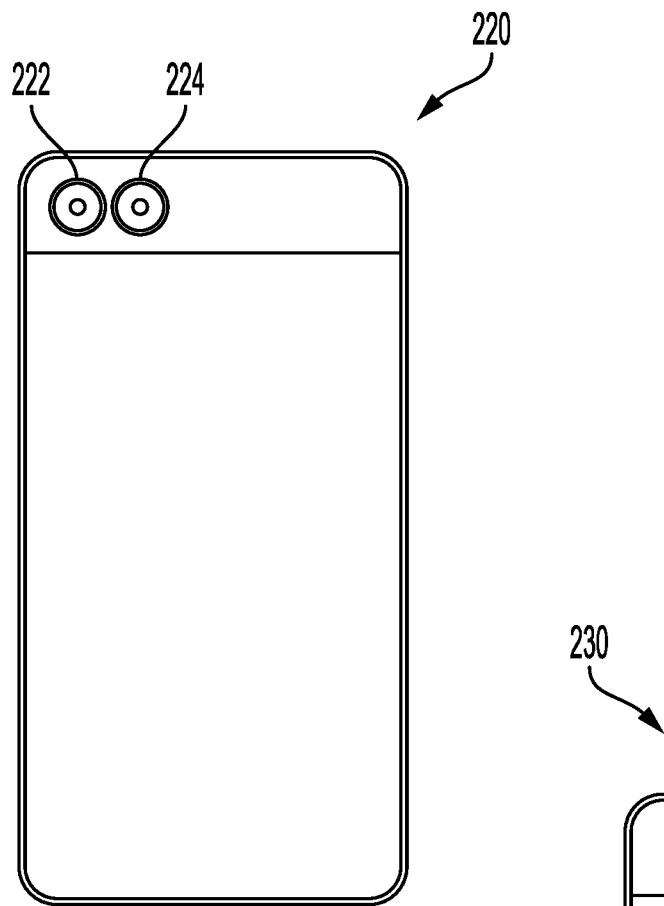
FIGS. 2C-2D depict examples of devices including multiple cameras.
Figure 2D:
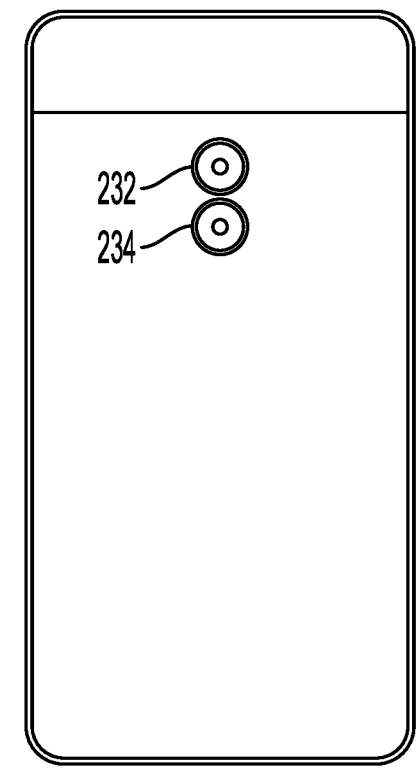

FIG. 2A depicts an example device 200 including a camera 202 arranged in a first configuration, and FIG. 2B depicts an example device 210 including a camera 212 arranged in a second configuration. FIG. 2C depicts an example device 220 including a dual camera with a first camera 222 and a second camera 224 arranged in a first configuration, and FIG. 2D depicts an example device 230 including a dual camera with a first camera 232 and a second camera 234 arranged in a second configuration. In some aspects, one of the cameras (such as the first cameras 222 and 232 of respective devices 220 and 230) may be a primary camera, and the other of the cameras (such as the second cameras 224 and 234 respective devices 220 and 230) may be an auxiliary camera. The second cameras 224 and 234 may have the same characteristics and capabilities (such as the same focal length, same capture rate, same resolution, same color palette, and the same field of view or capture) as the first cameras 222 and 232, respectively. Alternatively, the second cameras 224 and 234 may have different characteristics and abilities than the first cameras 222 and 232, respectively. Although the first cameras 222, 232 and second cameras 224, 234 are depicted in FIGS. 2C and 2D as being disposed on a common side of example devices 220 and 230, it will be understood that in some implementations a first camera can be disposed so as to face a different direction than a second camera. Thus, techniques and aspects disclosed herein can be implemented using a front facing camera and a rear facing camera. Similarly, the techniques and aspects disclosed herein can be applied in devices having other camera configurations, for example, 360 degree capture devices having at least one camera with a field-of-view that at least partially overlaps or at least abuts a field-of-view of a second camera. Any configuration of cameras may be used, and the disclosure should not be limited to the illustrated examples in FIGS. 2A, 2B, 2C, and 2D.

Figure 3A:
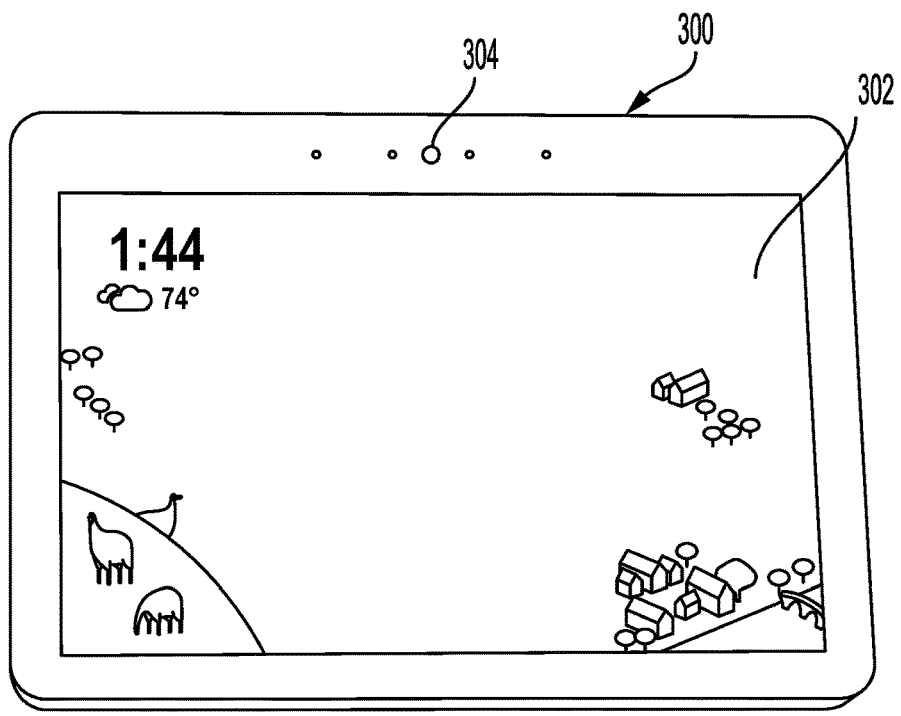
FIGS. 3A-3B depict examples of smart home and/or connected home devices.
Figure 3B:
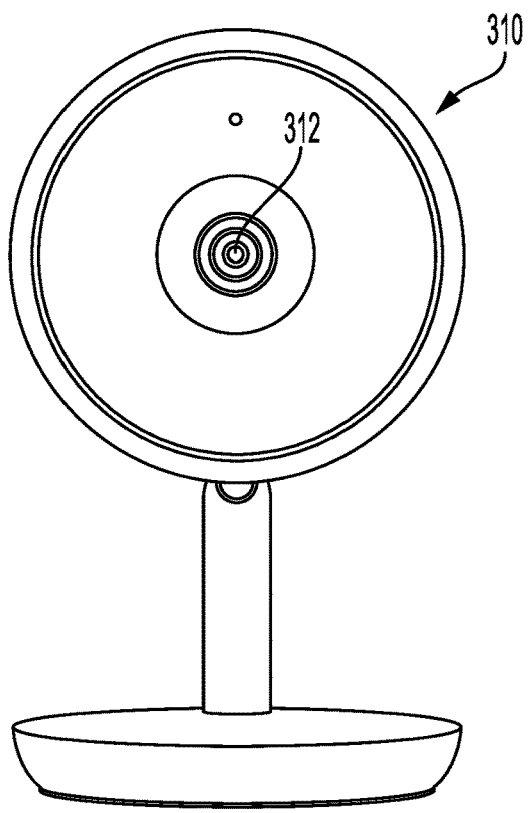

FIGS. 3A and 3B depict example smart home and/or connected home devices. Smart home and/or connected home devices may include surveillance devices. While FIG. 3A depicts smart home device 300 with a display 302 and camera 304, techniques and aspects disclosed herein can be implemented using any smart home device. FIG. 3B depicts a connected home device 310 that is different than smart home device 300. As shown, connected home device 310 does not include a display, but does include camera 312. While not shown in FIGS. 3A and/or 3B, smart home and/or connected home devices 300, 310 may include a microphone. These are provided for illustrative purposes only and are not meant to be a limitation of this disclosure.

The term "electronic device" and/or "device" may be used interchangeably herein and is not limited to one or a specific number of physical objects (such as one smartphone). As used herein, a device may be any electronic device with multiple parts that may implement at least some portions of this disclosure. In one example, a device may be a video security system including one or more hubs and one or more separate cameras. In another example, a device may be a computer. In another example, a device may be a smartphone including two cameras such as, for example, the example devices 220 and 230 of FIGS. 2C and 2D, respectively. While the below description and examples use the term "device" to describe various aspects of this disclosure, the term "device" is not limited to a specific configuration, type, or number of objects.

Figure 4:
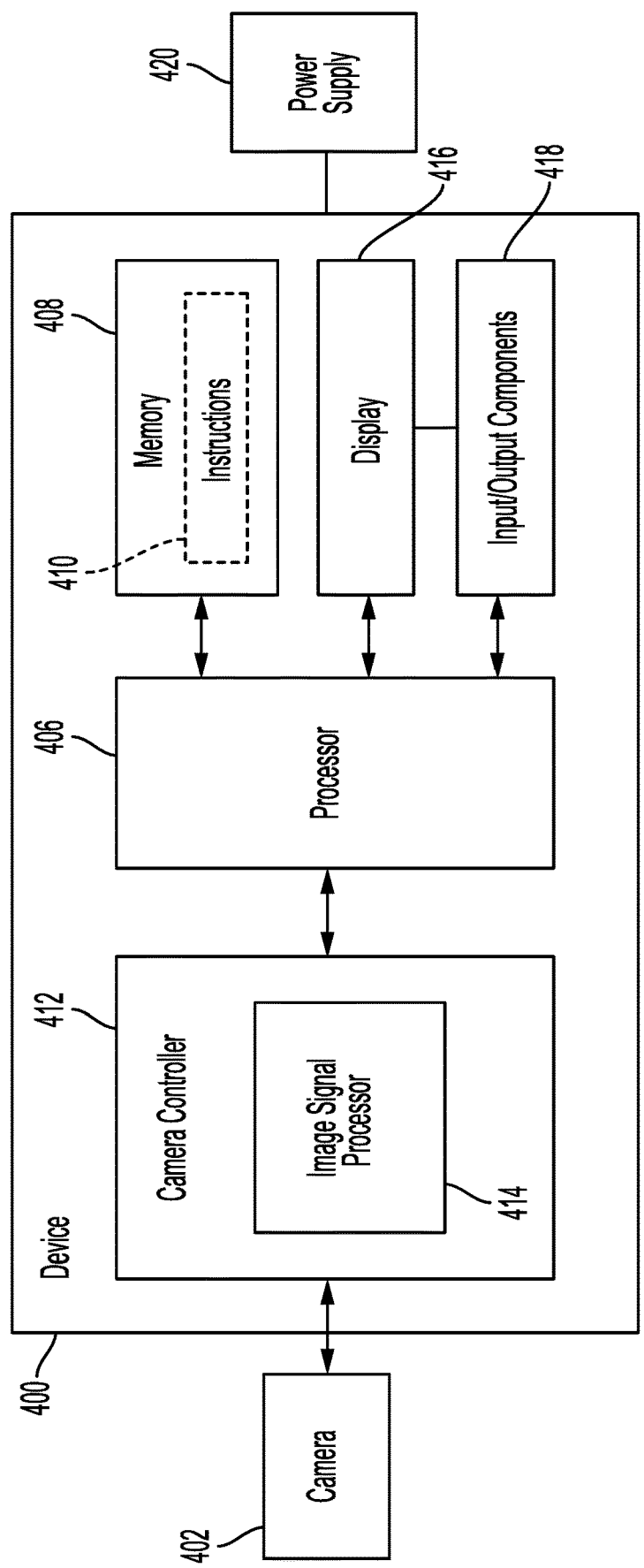
FIG. 4 is a block diagram of an example device.

FIG. 4 is a block diagram of an example device 400 that may be used to determine one or more capture settings based on an audio input. Device 400 may include or may be coupled to a camera 402, and may further include a processor 406, a memory 408 storing instructions 410, a camera controller 412, a display 416, and a number of input/output (I/O) components 418 including one or more microphones (not shown). The example device 400 may be any suitable device capable of capturing and/or storing images or video including, for example, wired and wireless communication devices (such as camera phones, smartphones, tablets, security systems, smart home devices, connected home devices, surveillance devices, internet protocol (IP) devices, dash cameras, laptop computers, desktop computers, automobiles, drones, aircraft, and so on), digital cameras (including still cameras, video cameras, and so on), or any other suitable device. The device 220 may include additional features or components not shown. For example, a wireless interface, which may include a number of transceivers and a baseband processor, may be included for a wireless communication device. Device 400 may include or may be coupled to additional cameras other than the camera 402. The disclosure should not be limited to any specific examples or illustrations, including the example device 400.

Camera 402 may be capable of capturing individual image frames (such as still images) and/or capturing video (such as a succession of captured image frames). Camera 402 may include one or more image sensors (not shown for simplicity) and shutters for capturing an image frame and providing the captured image frame to camera controller 412. Although a single camera 402 is shown, any number of cameras or camera components may be included and/or coupled to device 400 (such as FIGS. 2C and 2D). For example, the number of cameras may be increased to achieve greater depth determining capabilities or better resolution for a given FOV.

Memory 408 may be a non-transient or non-transitory computer readable medium storing computer-executable instructions 410 to perform all or a portion of one or more operations described in this disclosure. Device 400 may also include a power supply 420, which may be coupled to or integrated into the device 400.

Processor 406 may be one or more suitable processors capable of executing scripts or instructions of one or more software programs (such as the instructions 410) stored within memory 408. In some aspects, processor 406 may be one or more general purpose processors that execute instructions 410 to cause device 400 to perform any number of functions or operations. In additional or alternative aspects, processor 406 may include integrated circuits or other hardware to perform functions or operations without the use of software. While shown to be coupled to each other via processor 406 in the example of FIG. 4, processor 406, memory 408, camera controller 412, display 416, and I/O components 418 may be coupled to one another in various arrangements. For example, processor 406, memory 408, camera controller 412, display 416, and/or I/O components 418 may be coupled to each other via one or more local buses (not shown for simplicity).

Display 416 may be any suitable display or screen allowing for user interaction and/or to present items (such as captured images and/or videos) for viewing by the user. In some aspects, display 416 may be a touch-sensitive display. Display 416 may be part of or external to device 400. Display 416 may comprise an LCD, LED, OLED, or similar display. I/O components 418 may be or may include any suitable mechanism or interface to receive input (such as commands) from the user and/or to provide output to the user. For example, I/O components 418 may include (but are not limited to) a graphical user interface, keyboard, mouse, microphone and speakers, and so on.

Camera controller 412 may include an image signal processor 414, which may be (or may include) one or more image signal processors to process captured image frames or videos provided by camera 402. For example, image signal processor 414 may be configured to perform various processing operations for automatic focus (AF), automatic white balance (AWB), and/or automatic exposure (AE) that are described herein. Examples of image processing operations include, but are not limited to, cropping, scaling (e.g., to a different resolution), image stitching, image format conversion, color interpolation, image interpolation, color processing, image filtering (e.g., spatial image filtering), and/or the like.

In some example implementations, camera controller 412 (such as the image signal processor 414) may implement various functionality, including imaging processing and/or control operation of camera 402. In some aspects, image signal processor 414 may execute instructions from a memory (such as instructions 410 stored in memory 408 or instructions stored in a separate memory coupled to image signal processor 414) to control image processing and/or operation of camera 402. In other aspects, image signal processor 414 may include specific hardware to control image processing and/or operation of camera 402. Image signal processor 414 may alternatively or additionally include a combination of specific hardware and the ability to execute software instructions.

While not shown in FIG. 4, in some implementations, image signal processor 414 and/or camera controller 412 may include an AF module, an AWB module, and/or an AE module. Image signal processor 414 and/or camera controller 412 may be configured to execute an AF process, an AWB process, and/or an AE process. In some examples, image signal processor 414 and/or camera controller 412 may include hardware-specific circuits (e.g., an application-specific integrated circuit (ASIC)) configured to perform the AF, AWB, and/or AE processes. In other examples, image signal processor 414 and/or camera controller 412 may be configured to execute software and/or firmware to perform the AF, AWB, and/or AE processes. When configured in software, code for the AF, AWB, and/or AE processes may be stored in memory (such as instructions 410 stored in memory 408 or instructions stored in a separate memory coupled to image signal processor 414 and/or camera controller 412). In other examples, image signal processor 414 and/or camera controller 412 may perform the AF, AWB, and/or AE processes using a combination of hardware, firmware, and/or software. When configured as software, AF, AWB, and/or AE processes may include instructions that configure image signal processor 414 and/or camera controller 412 to perform various image processing and device managements tasks, including the techniques of this disclosure.

Figure 5:
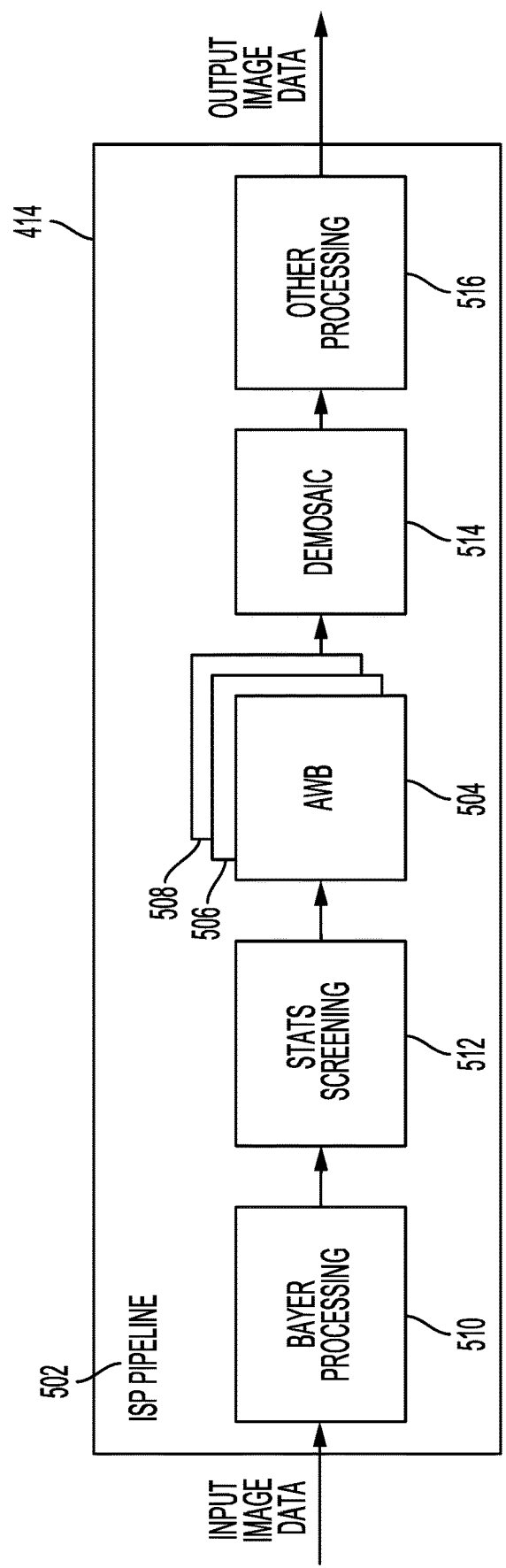
FIG. 5 is a block diagram showing the operation of an image signal processor pipeline.

FIG. 5 is a block diagram showing the operation of an image signal processor determining one or more image capture settings in more detail. Image signal processor 414 may be configured to execute an image signal processing (ISP) pipeline 502 to process input image data.

In the example of FIG. 5, ISP 414 may receive input image data from camera 402 of FIG. 4 and/or an image sensor (not shown) of camera 402. In some examples, such as shown in FIG. 5, the input image data may include color data of the image/frame and/or any other data (e.g., depth data). In the example of FIG. 5, the color data received for the input image data may be in a Bayer format. Rather than capturing red (R), green (G), and blue (B) values for each pixel of an image, image sensors (e.g., an image sensor of camera 402) may use a Bayer filter mosaic (or more generally, a color filter array (CFA)), where each photosensor of a digital image sensor captures a different one of the RGB colors. Typical filter patterns for a Bayer filter mosaic may include 50% green filters, 25% red filters, and 25% blue filters, but this is for exemplary purposes only and is not meant to be a limitation of this disclosure.

Bayer processing unit 510 may perform one or more initial processing techniques on the raw Bayer data received by ISP 414, including, for example, subtraction, rolloff correction, bad pixel correction, black level compensation, and/or denoising.

Stats screening process 512 may determine Bayer grade or Bayer grid (BG) statistics of the received input image data. In some examples, BG statistics may include a red color to green color ratio (R/G) (which may indicate whether a red tinting exists and the magnitude of the red tinting that may exist in an image) and/or a blue color to green color ratio (B/G) (which may indicate whether a blue tinting exists and the magnitude of the blue tinting that may exist in an image). For example, the (R/G) for an image or a portion/region of an image may be depicted by equation (1) below:

$$R/G = \frac{\sum_{n=1}^{N} \text{Red}(n)}{\sum_{n=1}^{N} \text{Green}(n)} \quad (1)$$

where the image or a portion/region of the image includes pixels 1-N, each pixel n includes a red value Red(n), a blue value Blue(n), or a green value Green(n) in an RGB space. The (R/G) is the sum of the red values for the red pixels in the image divided by the sum of the green values for the green pixels in the image. Similarly, the (B/G) for the image or a portion/region of the image may be depicted by equation (2) below:

$$B/G = \frac{\sum_{n=1}^{N} \text{Blue}(n)}{\sum_{n=1}^{N} \text{Green}(n)} \quad (2)$$

In some other example implementations, a different color space may be used, such as Y'UV, with chrominance values UV indicating the color, and/or other indications of a tinting or other color temperature effect for an image may be determined.

AWB module and/or process 504 may analyze information relating to the received image data to determine an illuminant of the scene, from among a plurality of possible illuminants, and may determine an AWB gain to apply to the received image and/or a subsequent image based on the determined illuminant. White balance is a process used to try to match colors of an image with a user's perceptual experience of the object being captured. As an example, the white balance process may be designed to make white objects actually appear white in the processed image and gray objects actually appear gray in the processed image.

An illuminant may include a lighting condition, a type of light, etc. of the scene being captured. In some examples, a user of an image capture device (e.g., such as device 400 of FIG. 4) may select or indicate an illuminant under which an image was captured. In other examples, the image capture device itself may automatically determine the most likely illuminant and perform white balancing based on the determined illuminant (e.g., lighting condition). In order to better render the colors of a scene in a captured image or video, an AWB algorithm on a device and/or camera may attempt to determine the illuminants of the scene and set/adjust the white balance of the image or video accordingly.

Device 400, during the AWB process 504, may determine or estimate a color temperature for a received frame (e.g., image). The color temperature may indicate a dominant color tone for the image. The true color temperature for a scene being captured in a video or image is the color of the light sources for the scene. If the light is radiation emitted from a perfect blackbody radiator (theoretically ideal for all electromagnetic wavelengths) at a particular color temperature (represented in Kelvin (K)), and the color temperatures are known, then the color temperature for the scene is known. For example, in a Commission Internationale de l'éclairage (CIE) defined color space (from 1931), the chromaticity of radiation from a blackbody radiator with temperatures from 1,000 to 20,000 K is the Planckian locus. Colors on the Planckian locus from approximately 2,000 K to 20,000 K are considered white, with 2,000 K being a warm or reddish white and 20,000 K being a cool or bluish white. Many incandescent light sources include a Planckian radiator (tungsten wire or another filament to glow) that emits a warm white light with a color temperature of approximately 2,400 to 3,100 K.

However, other light sources, such as fluorescent lights, discharge lamps, or light emitting diodes (LEDs), are not perfect blackbody radiators whose radiation falls along the Planckian locus. For example, an LED or a neon sign emit light through electroluminescence, and the color of the light does not follow the Planckian locus. The color temperature determined for such light sources may be a correlated color temperature (CCT). The CCT is the estimated color temperature for light sources whose colors do not fall exactly on the Planckian locus. For example, the CCT of a light source is the blackbody color temperature that is closest to the radiation of the light source. CCT may also be denoted in K.

CCT may be an approximation of the true color temperature for the scene. For example, the CCT may be a simplified color metric of chromaticity coordinates in the CIE 1931 color space. Many devices may use AWB to estimate a CCT for color balancing.

The CCT may be a temperature rating from warm colors (such as yellows and reds below 3200 K) to cool colors (such as blue above 4000 K). The CCT (or other color temperature) may indicate the tinting that will appear in an image captured using such light sources. For example, a CCT of 2700 K may indicate a red tinting, and a CCT of 5000 K may indicate a blue tinting.

Different lighting sources or ambient lighting may illuminate a scene, and the color temperatures may be unknown to the device. As a result, the device may analyze data captured by the image sensor to estimate a color temperature for an image (e.g., a frame). For example, the color temperature may be an estimation of the overall CCT of the light sources for the scene in the image. The data captured by the image sensor used to estimate the color temperature for a frame (e.g., image) may be the captured image itself.

After device 400 determines a color temperature for the scene (such as during performance of AWB), device 400 may use the color temperature to determine a color balance for correcting any tinting in the image. For example, if the color temperature indicates that an image includes a red tinting, device 400 may decrease the red value or increase the blue value for each pixel of the image, e.g., in an RGB space. The color balance may be the color correction (such as the values to reduce the red values or increase the blue values).

Example inputs to AWB process 504 may include the Bayer grade or Bayer grid (BG) statistics of the received image data determined via stats screening process 512, an exposure index (e.g., the brightness of the scene of the received image data), and auxiliary information, which may include the contextual information of the scene based on the audio input (as will be discussed in further detail below), depth information, etc. It should be noted that AWB process 504 may be included within camera controller 412 of FIG. 4 as a separate AWB module.

AE process 506 may include instructions for configuring, calculating, and/or storing an exposure setting of camera 402 of FIG. 4. An exposure setting may include an amount of sensor gain to be applied, an amount of digital gain to be applied, shutter speed and/or exposure time, an aperture setting, and/or an ISO setting to use to capture subsequent images. As will be discussed in further detail below, AE process 506 may use the audio input and/or the contextual information of the scene based on the audio input to determine and/or apply exposure settings faster. It should be noted that AE process 506 may be included within camera controller 412 of FIG. 4 as a separate AE module.

AF process 508 may include instructions for configuring, calculating and/or storing an auto focus setting of camera 402 of FIG. 4. As will be discussed in further detail below, AF process 508 may determine the auto focus setting (e.g., an initial lens position, a final lens position, etc.) based on the audio input and/or the contextual information of the scene based on the audio input. It should be noted that AF process 508 may be included within camera controller 412 of FIG. 4 as a separate AF module.

Demosaic processing unit 514 may be configured to convert the processed Bayer image data into RGB values for each pixel of an image. As explained above, Bayer data may only include values for one color channel (R, G, or B) for each pixel of the image. Demosaic processing unit 514 may determine values for the other color channels of a pixel by interpolating from color channel values of nearby pixels. In some ISP pipelines 402, demosaic processing unit 514 may come before AWB, AE, and/or AF processes 504, 506, 508 or after AWB, AE, and/or AF processes 504, 506, 508.

Other processing unit 516 may apply additional processing to the image after AWB, AE, and/or AF processes 504, 506, 508 and/or demosaic processing unit 514. The additional processing may include color, tone, and/or spatial processing of the image.

Figure 6:
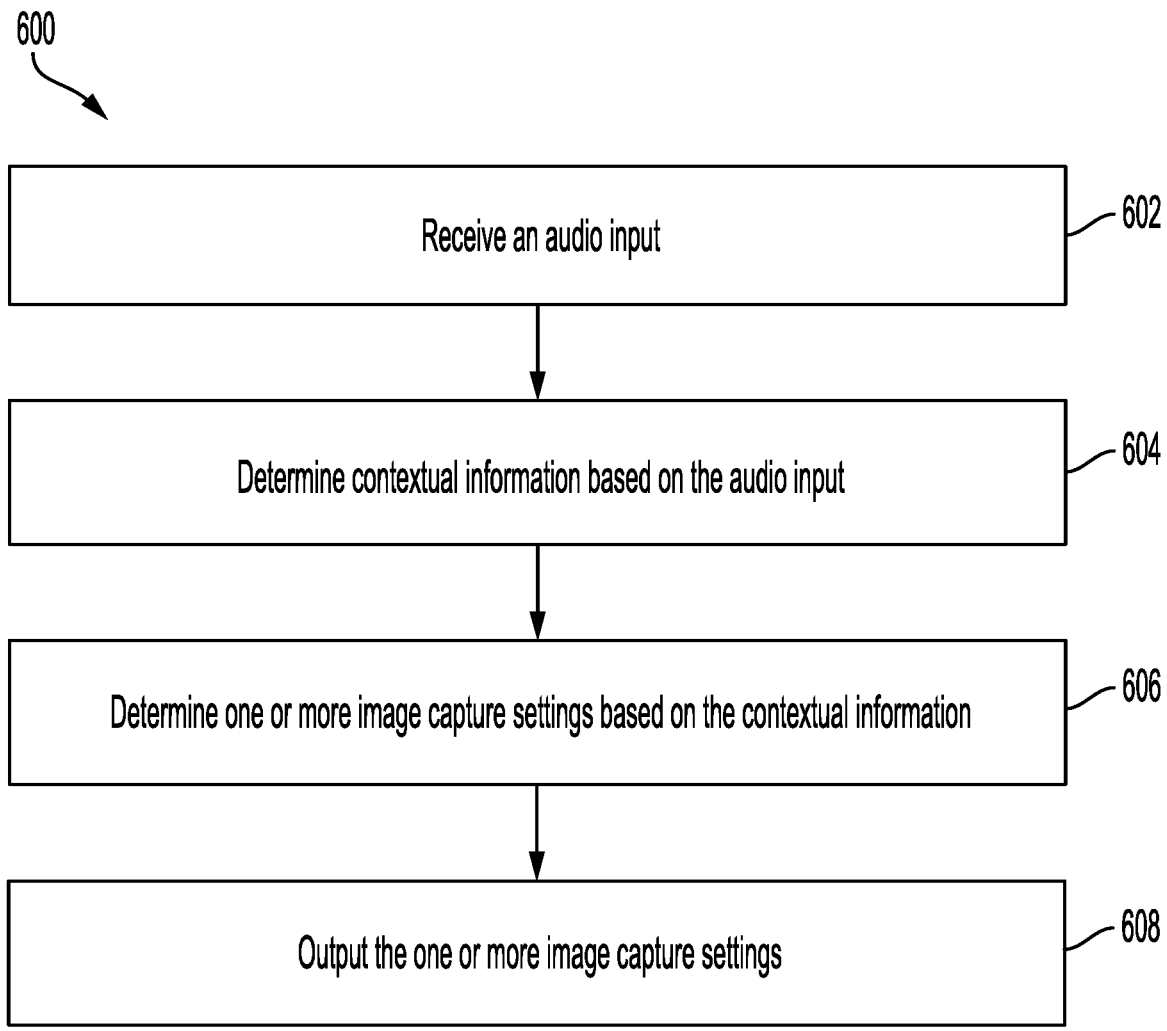
FIG. 6 is a flow chart illustrating an example operation for determining image capture settings based on an audio input.

FIG. 6 is an illustrative flow chart depicting an example of a method 600 for determining image capture settings based on an audio input. Method 600 may be stored as instructions 410 within memory 408 of FIG. 4. Method 600 may be executed by one or more processors (e.g., processor 406, camera controller 412, and/or image signal processor 414 as shown in FIG. 4, and/or other processors not shown in FIG. 4).

At block 602, method 600 may receive an audio input. The audio input may be received via one or more microphones. As discussed above, the device (e.g., device 400 of FIG. 4) may include one or more microphones. The device may always receive audio inputs of its surrounding environment via the one or more microphones. The audio inputs may include, but is not limited to, speech, music, and/or ambient noises/sounds, such as street noise.

At block 604, method 600 may determine contextual information based on the audio input. Determining contextual information may include processing the audio input to analyze the audio input for the contextual information. In some examples, the audio input and/or the contextual information may include one or more keywords. One or more processors and/or hardware accelerators of the device may determine the contextual information and/or keywords based on the audio input. The contextual information may include data that gives context to the environment in which the device is in. For example, contextual information may include data about the environment such as whether the device is indoors or outdoors and what the lighting conditions of the environment may be (e.g., low light, incandescent, fluorescent, sunlight, bright, shade, etc.). While the contextual information may be determined from the audio input alone, in some examples, the contextual information may be determined from various sensors, subsystems, and/or peripheral devices that gather additional information and/or metadata about the surrounding environment of the device. For example, the device may include one or more sensors or subsystems, including, but not limited to, a motion sensor, a light sensor, a positioning system (e.g., a GPS receiver), a temperature sensor, a biometric sensor, a gyroscope, a compass, an accelerometer, and the like. Using any of the sensors, subsystems, or peripheral devices, metadata associated with the physical state of the device (e.g., date, time, device orientation, device location in the real world, device temperature, exterior temperature, power level, speed, acceleration, motion, cellular strength, etc.) may be determined. In this manner, the contextual information may be determined based on the audio input and the metadata. For example, the metadata may provide information such as whether the device is moving at a particular speed in a specific location in the real world, what the current local time is where the device is located, and/or what the current weather conditions are where the device is located.

A list of contextual information and/or keywords that device 400 may use to determine one or more image capture settings based on the audio input may be stored in memory (e.g., memory 408 of FIG. 4). The audio input and/or the contextual information may be stored in a lookup table. The audio input and/or the contextual information may be encoded into combinations that may be meaningful to different applications of device 400 (e.g., camera, etc.). In some cases, the audio input and/or contextual information is stored for a period of time before being overwritten by a current audio input and/or contextual information determined from the current audio input. For example, the period of time may be 10 seconds, 30 seconds, 1 minute, 2 minutes, etc. The period of time may vary based on user preferences, the audio input and/or the contextual information being stored, the application that may request or require the audio input and/or the contextual information, and/or the device itself.

The audio input and/or the contextual information may be provided to camera controller 412 and/or ISP 414 of FIG. 4. In some cases, all of the audio input, keywords, and/or the contextual information (encoded or not encoded)) that are determined may be output to camera controller 412 and/or ISP 414 as an input to use to determine the one or more image capture settings. In other cases, only a subset of the audio input, keywords, and/or the contextual information (encoded or not encoded) that are determined may be output to camera controller 412 and/or ISP 414 as an input to use to determine the one or more image capture settings. For example, all of the audio input, the contextual information, and/or keywords may be provided to camera controller 412 and/or the ISP 414 in real time and/or within a threshold period of time (which may be the same as or different as the period of time discussed above) and/or a subset of the audio input, the contextual information and/or keywords may be provided to camera controller 412 and/or the ISP 414 in real time and/or within a threshold period of time. The subset of the audio input, the contextual information and/or keywords may include the contextual information and/or keywords that may help determine the one or more image capture settings. For example, birds chirping may indicate that the device is either indoors with the windows open or is outdoors, while music alone may not necessarily help determine the one or more image capture settings. In some cases, camera controller 412 and/or ISP 414 may request the audio input, the contextual information, and/or keywords (encoded or not encoded) when a camera application is launched and/or initialized. In other cases, if the camera application is currently open, the audio input, the contextual information, and/or keywords may be received first at initialization and in real time thereafter, or first at initialization and then periodically thereafter. Alternatively, the audio input, the contextual information, and/or keywords may be received by camera controller 412 and/or ISP 414 first at initialization and then when a change in the environment is detected based on the audio input, the contextual information, and/or keywords after initialization.

At block 606, method 600 may determine one or more image capture settings based on the audio input and/or the contextual information. The audio input and/or the contextual information may include one or more keywords. The one or more image capture settings may be determined periodically and/or in real time or near real time while the camera application is open/active. The one or more image capture settings may be determined after a camera application has been initialized. The one or more image capture settings may be determined upon initialization of the camera application based on the audio input, the contextual information, and/or keywords stored in the memory for the period of time, as discussed above.

The one or more image capture settings may be determined periodically and/or in real time or near real time while the camera application is open/active. The one or more image capture settings may include at least one of a white balance gain, an exposure setting, and/or a lens position. A first frame may be received via camera 402 of FIG. 4 in or near real-time. The first frame may or may not be stored in permanent memory (e.g., memory 408 of FIG. 4 or external memory not shown in FIG. 4). The first frame may include a preview frame as part of a preview stream that may be displayed via a display associated with device 400 (e.g., a preview frame displayed via display 416 of FIG. 4). The first frame may include a frame (e.g., image) to be captured by device 400 (e.g., an image to be stored in memory 408 and/or a photo library for later access by a user). The first frame may include a field of view of device 400. The first frame may be the first frame of a plurality of frames (e.g., a plurality of frames being received at device 400 for preview, image capture, or video capture). For example, the first frame may be the first frame received at device 400 after accessing and/or opening camera 402 and/or a camera application of device 400. Alternatively, the first frame may be any frame within a plurality of frames received at device 400 (e.g., for preview, image capture, or video capture).

Determining one or more image capture settings may include determining a white balance gain. As described above, determining the white balance gain based on a current frame (e.g., the first frame) may include determining current statistics associated with the current frame and determining the white balance gain based on the current statistics and the audio input and/or the contextual information (which may include keywords).

Determining current statistics associated with the current frame (e.g., the first frame) may be determined in a similar manner as described above with reference to stats screening process 512 of FIG. 5. Referring to FIG. 7A, the current frame 700 (e.g., the first frame) may be divided into portions 702a-702n (e.g., 3,072 portions, or any other number of portions, including 1 portion as the entire frame). The current statistics may include BG stats (e.g., R/G and B/G). The R/G and the B/G may be calculated for each portion 702a-702n. For example, if the current frame 700 is divided into 3,072 portions, then 3,072 pairs of BG stats (e.g., 3,072 R/G stats and 3,072 B/G stats) may be determined for the current frame.

Figure 7B:
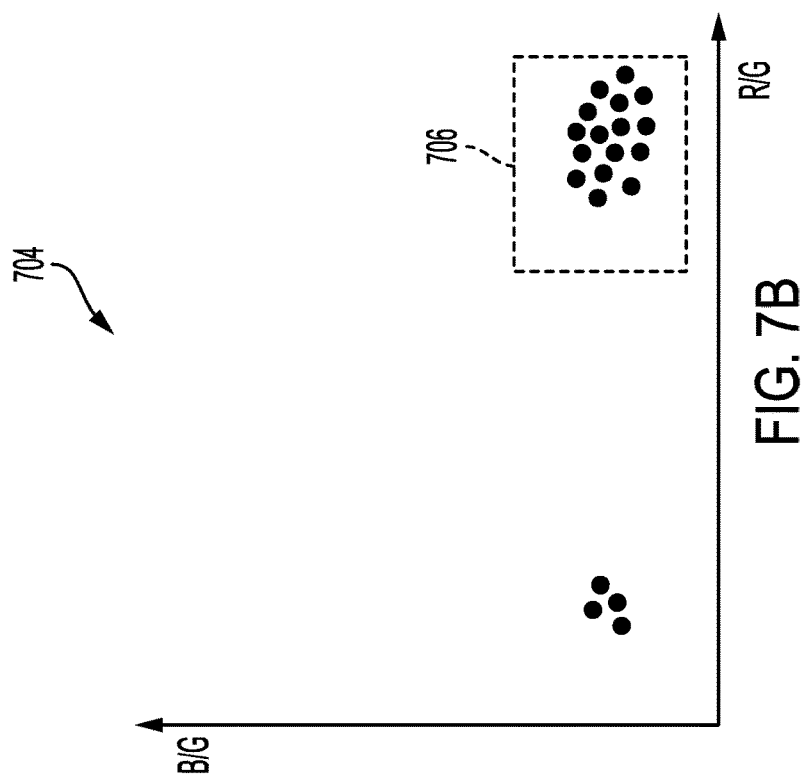
FIG. 7B depicts an exemplary graph used to determine white balance gain.
Figure 7A:
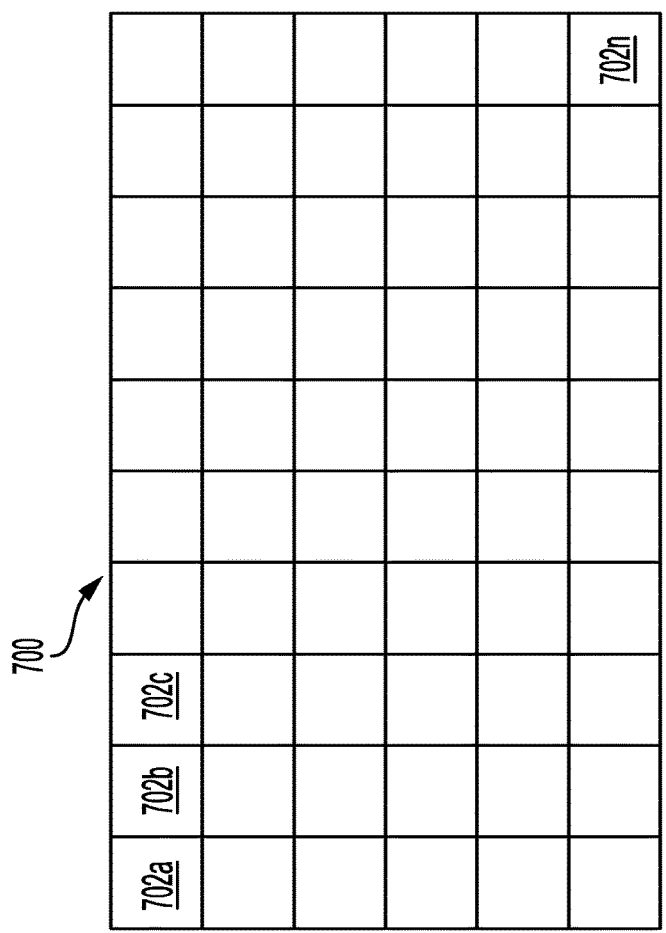
FIG. 7A depicts a frame divided into a plurality of portions.

Referring to FIG. 7B, graph 704 depicts an example distribution of the R/G versus the B/G for some portions 702a-702n of current frame 700 of FIG. 7A. While any white balance algorithm may be used to determine white balance gains and/or color correction based on the current statistics, one technique may include the "gray world assumption", which assumes that any scene is a neutral gray. That is, under the "gray world assumption", all the colors in a frame (e.g., image) should average out to a neutral gray. The distribution of BG stats (e.g., an example distribution is shown in FIG. 7B) may include different regions of the distribution (e.g., different regions in graph 704) they may be defined as "gray zones" for different illuminants. For example, the most likely illuminant of the image may be determined based on the illuminant for which the most BG stats fall within a defined region or zone. For example, graph 704 may include a gray zone (e.g., gray zone 706). Gray zone 706 may be used to estimate an illuminant based on the current statistics. In one example, incandescent lighting (such as having a color temperature of 2400 K) may cause measurements (e.g., statistics) for portions of the image to be located in graph 704 farther away from the B/G axis. In another example, fluorescent lighting (such as having a color temperature of 4100 K) may cause measurements (e.g., statistics) for portions of the image to be located in graph 704 closer to the B/G axis. In this manner, if the device determines that a cluster of portions (such as having a number of points greater than a threshold within a range of R/G to B/G) is near a location for a type of lighting, the device may determine the color temperature for the current frame to be near or approximate to the color temperature for the illuminant (e.g., incandescent lighting, fluorescent lighting, shade, etc.). As discussed above, this is for exemplary purposes only and is not meant to be a limitation of this disclosure. As such, any white balance algorithm may be used.

The white balance gain may be determined based on the current statistics and the audio input and/or the contextual information. While the current statistics may indicate the most likely illuminant for a scene or environment being captured, more than one illuminant may be identified, thus causing ambiguities in illuminant selection or the most likely illuminant may be inaccurate. To alleviate the ambiguities in illuminant selection, weight values may be assigned to various illuminants based on the audio input and/or the contextual information. In this manner, device 400 may use the current statistics with a probability, as indicated by the weight value, that a particular illuminant is likely to be close to the actual illuminant of the scene/environment. For example, the audio input and/or the contextual information may provide a relative likelihood of whether device 400 at the time or near the time at which the current frame was received and/or captured is indoors or outdoors. Based on the audio input and/or the contextual information indicating that device 400 is outdoors while capturing the current frame, relatively higher weight values may be assigned to outdoor illuminants than indoor illuminants. Alternatively, based on the audio input and/or the contextual information indicating that device 400 is indoors while capturing the current frame, relatively higher weight values may be assigned to indoor illuminants than outdoor illuminants.

For example, perhaps the current statistics for the current frame indicate that the same or near same (e.g., within a threshold) number of statistics exist for a sunny midday illuminant as for a shade illuminant (e.g., the shade illuminant could be indoors or outdoors). However, the audio input and/or the contextual information received at or near the time at which the current frame was received indicates that device 400 is outdoors (e.g., street noise, wind noise, etc.). As such, higher weight values may be assigned to outdoor illuminants than indoor illuminants, resulting in the sunny midday illuminant having a higher weight than the shade illuminant.

Continuing with this example, if device 400 receives an audio input of a conversation including the words "let's go in the shade" "let's go under the tree," device 400 may determine the contextual information of the surrounding environment of device 400 may change in the near future. Based on the fact that the device is outdoors, as previously determined, and with the new contextual information indicating that device 400 may be moving to a shaded area (e.g., either by the words indicating shade or under the tree), a higher weight value may be assigned to the shade illuminant than the sunny midday illuminant. Based on the higher weight value assigned to the shade illuminant, device 400 may determine white balance gains based on the shade illuminant. Device 400 may apply the white balance gains to the current frame and/or to one or more subsequent frames.

Device 400 may select the most likely illuminant based on current statistics and the applied weight values. Device 400 may then determine the white balance gain to apply to the current frame or a subsequent frame after the current frame based on the most likely illuminant.

In some examples, the assigned weight values may gradually change over time. For example, if at time t when the current frame was received, a first weight value is assigned to the sunny midday illuminant and a second weight value is assigned to the shade illuminant, where the first weight value is greater than the second weight value, and a few seconds later, new (e.g., current) contextual information indicates that the lighting conditions of the surrounding environment of device 400 may change in the near future to a shade illuminant, but has not actually changed yet based on continuously received frames, the weight values associated with the sunny midday illuminant, the shade illuminant, and/or other illuminants may gradually change over time such that smaller and smaller weight values may be assigned to the sunny midday illuminant and greater and greater weight values may be assigned to the shade illuminant over time as device 400 moves to the shaded area, as indicated by the audio input. In this manner, white balance gains associated with the shade illuminant or white balance gains associated with an illuminant more similar to the shade illuminant than the sunny midday illuminant may be determined and/or applied to frames being received at device 400 by the time device 400 is moved into the shade. The determined white balance gains and/or most likely illuminant may be stored to memory (e.g., memory 408 of FIG. 4).

Determining one or more image capture settings may include determining one or more exposure settings. The one or more exposure settings may include at least one of an ISO setting, a shutter speed and/or an exposure time, an aperture size, a sensor gain, and/or a digital gain. The ISO setting may indicate the sensitivity of the image sensor, with a higher value indicating higher sensitivity for the image sensor. The shutter speed may indicate the number of frames that can be captured in a second, the amount of time before closing the shutter of a camera, or some other measurement of time indicating the amount of time the image sensor is exposed (e.g., exposure time) for receiving light through the aperture. The aperture size may be a number or value to indicate the size of the aperture. The value may indicate a specific size of the aperture or indicate the size of the aperture relative to the size of the image sensor. The sensor gain may be a multiplier applied at the image sensor that amplifies light levels received at the image sensor. The digital gain may be a multiplier applied by the camera controller 412, ISP 414, and/or AE process/module 506 to amplify the light levels of the image during image processing.

Determining the one or more exposure settings may include determining current statistics associated with a current frame (e.g., the first frame from the example above), determining a current sensor gain associated with the current frame, determining a current digital gain associated with the current frame, determining a current exposure time associated with the current frame, and determining the one or more exposure settings based on the current statistics, the current sensor gain, the current digital gain, the current exposure time, and the audio input and/or the contextual information. The current statistics associated with the current frame may be the same as the current statistics determined above with reference to stats screening process 512. The current sensor gain, the current digital gain, and the current exposure time and/or shutter speed associated with the current frame may be known parameters. Determining known parameters of one or more current exposure settings associated with the current frame may include the camera controller 412 and/or ISP 414 receiving the known parameters as input with the input image data, receiving the known parameters from memory, receiving the known parameters from AE process 506, and/or by other means. The device may use the known parameters along with the current statistics associated with the current frame to determine one or more exposure settings based on the audio input and/or the contextual information.

Determining one or more exposure settings based on the audio input and/or the contextual information may include determining one or more of a subsequent sensor gain, a subsequent digital gain, and/or a subsequent exposure time. Device 400 may have a target luma value for incoming frames indicating the target brightness of the incoming frames. If the incoming frames do not match with the target luma value, changes in one or more exposure settings may be made until the target luma value is reached in subsequent frames. The target luma value may be based on the BG stats. For example, if the target luma value is 50, but the current luma value based on the current statistics associated with the current frame is 200, and the current sensor gain, the current digital gain, and the current exposure time is known, device 400 may adjust one or more of the exposure settings to reach the target luma value of 50 for one or more subsequent frames. For example, device 400 may determine that a subsequent sensor gain to be applied at the sensor should be 4 times less than the current sensor gain (e.g., 200/50=4). Device 400 may further determine that a subsequent digital gain to be applied by ISP 414 should be 4 times greater than the current digital gain. In some examples, until the brightness of the current frame actually begins to change as compared to a previous frame, the subsequent sensor gain and the subsequent digital gain should be inversely proportional to one another to ensure that the overall total sensitivity based on the sensor gain and the digital gain is the same. In the example above, the subsequent sensor gain is determined to be 4 times less, and the subsequent digital gain is determined to be 4 times greater, which is inversely proportional to the subsequent sensor gain. When the brightness of the current frame begins to change as compared to a previous frame, different amounts of gain may be determined for the sensor gain and the digital gain such that they are not inversely proportional to each other and the total sensitivity based on the sensor gain and the digital gain may be changed.

Determining the one or more exposure settings may include determining a subsequent exposure time. Using the example above, if the current exposure time is known and the target luma value is 50, but the current luma value based on the current statistics is 200, device 400 may determine to adjust the exposure time for capturing one or more subsequent frames. For example, determining the subsequent exposure time for the example above may include reducing the exposure time when capturing the one or more subsequent frames. Because the current luma value is higher than the target luma value, the current frame may be brighter than the target brightness, and so reducing the exposure time (and/or the shutter speed) for capturing one or more subsequent frames in addition to or independent of adjusting the sensor gain and/or the digital gain may reduce the overall brightness of the one or more subsequent frames.

Determining the one or more exposure settings (e.g., one or more of the subsequent sensor gain, the subsequent digital gain, and/or one or more of the shutter speed and/or the exposure time) may include determining the one or more exposure settings based on the current statistics, the current sensor gain, the current digital gain, the current exposure time, and the audio input and/or the contextual information. For example, if the current frame is currently at the target brightness and device 400 receives an audio input including a conversation in the surrounding environment that includes the words "turn on the light," or "open the curtains," the device may determine that in a short period of time, the lighting conditions of the environment/scene may change to a brighter state. As such, device 400 may determine, based on the audio input and/or the contextual information, a subsequent sensor gain, a subsequent digital gain, and/or a subsequent exposure time and/or shutter speed based on the indication that the environment may be brighter in the near future. In this manner, device 400 may determine to reduce the sensor gain as compared to the current sensor gain, increase the digital gain as compared to the current digital gain, and/or adjust the shutter speed and/or the exposure time to a shorter exposure time in preparation for the brighter environment. The adjustments may be made immediately or the adjustments may happen gradually over time until the lighting conditions actually change. In this manner, by the time the light turns on or the curtains are opened, the camera and/or device is already in a state with adjusted exposure settings such that either the sensor does not saturate due to the drastic change in lighting and/or when the light conditions do change, final exposure settings may be determined faster than waiting to make any adjustments at all until the lighting conditions actually change. Alternatively, if the audio input includes the words "turn off the light" or "close the curtains," the device may make gradual adjustments to one or more exposure settings to compensate for an upcoming change of lighting conditions for less light (e.g., longer exposure time and/or higher shutter speed, higher sensor gain, lower digital gain, etc.).

Determining the one or more exposure settings may include determining a subsequent aperture size and/or a subsequent ISO setting based on the audio input and/or the contextual information. Similarly as above, based on the current statistics associated with the current frame and/or one or more other known parameters of the one or more exposure settings and the known target luma value, device 400 may determine a subsequent aperture size and/or a subsequent ISO setting based on the audio input and/or the contextual information for capturing one or more subsequent frames. The determined one or more exposure settings (e.g., the one or more subsequent exposure settings) may be stored to memory (e.g., memory 408 of FIG. 4).

Determining the one or more image capture settings based on the audio input and/or the contextual information may include determining a lens position based on the audio input and/or the contextual information. For example, if the audio input includes the words "let's go outside," then the device may determine that in the near future, device 400 may be moving from indoors to outdoors. In this manner, device 400 may determine that a current lens position of the camera (e.g., camera 402 of FIG. 4) should move to a lens position for an outdoors landscape where regions of interest may be farther away from device 400 and/or camera 402 than in an indoor setting. The adjustment may occur immediately or gradually over time. Alternatively, if the audio input includes the words "let's go inside," then device 400 may determine that in a short period of time, device will be moving from outdoors to indoors. In this manner, device 400 may determine that a current lens position of camera 402 should move to a lens position for indoor image capture where regions of interest may be closer to camera 402 and/or device 400 than in an outdoor setting. While further adjustments to the lens position may be made at the time of capturing an image, the lens may be moved to a position closer to the final lens position based on the audio input, resulting in a faster autofocus process than waiting to move the lens until the user is ready to capture an image. The determined lens position may be stored to memory (e.g., memory 408 of FIG. 4).

At block 608, method 600 may output the one or more image capture settings. The one or more image capture settings may include one or more of the determined white balance gains, the one or more determined exposure settings (e.g., the one or more subsequent exposure settings), and/or the determined lens position. Outputting the one or more image capture settings may include applying the white balance gain to the current frame and/or one or more subsequent frames. Outputting the one or more image capture settings may include storing the white balance gain to memory. Outputting the one or more image capture settings may include applying the one or more exposure settings. Applying the one or more exposure settings may include one or more of applying the subsequent sensor gain when capturing one or more subsequent frames, applying the subsequent digital gain to one or more subsequent frames, applying the subsequent exposure time and/or shutter speed when capturing one or more subsequent frames (e.g., adjusting the current shutter speed and/or exposure time to the subsequent shutter speed and/or subsequent exposure time), applying the subsequent aperture size (e.g., adjusting the current aperture size to the subsequent aperture size), and/or applying the subsequent ISO setting (e.g., adjusting the current ISO setting to the subsequent ISO setting). Outputting the one or more image capture settings may include storing the one or more exposure settings to memory. Outputting the one or more image capture settings may include applying the lens position (e.g., adjusting a current lens position of the camera to a subsequent lens position of the camera). Outputting the one or more image capture settings may include storing the lens position.

Device 400 may output the current frame and/or one or more subsequent frames with the applied one or more image capture settings for display via a display associated with device 400 (e.g., e.g., display 416 of FIG. 4). Outputting the current frame and/or one or more subsequent frames with the applied one or more image capture settings for display may include outputting the current frame and/or one or more subsequent frames with the applied white balance gain for display. Outputting the current frame and/or one or more subsequent frames with the applied one or more image capture settings for display may include outputting the current frame and/or one or more subsequent frames with the applied one or more exposure settings for display. Outputting the current frame and/or one or more subsequent frames with the applied one or more image capture settings for display may include outputting the current frame and/or one or more subsequent frames with the applied lens position for display.

In some examples, determining the one or more image capture settings based on the audio input and/or the contextual information may include determining the one or more image capture settings upon initialization of a camera application based on the audio input and/or the contextual information stored in the memory for a period of time. For example, perhaps the camera application is currently closed and has not been opened and/or initialized yet, but device 400 is still receiving audio inputs (e.g., because the device is an always-on or always listening device). As discussed above, device 400 may store the audio input and/or contextual information (including one or more keywords) in memory (e.g., memory 408 of FIG. 4) for a period of time. When the camera application is opened and/or initialized, camera controller 412 and/or ISP 414 may receive the audio input and/or contextual information that was stored within the memory within a threshold period of time (e.g., 10 seconds, 20 seconds, 30 seconds, etc.) before the camera application was opened in order to use the most recent audio inputs and/or contextual information received prior to opening the camera application in order to determine initial image capture settings. In this manner, a current or first frame may not be received when the initial image capture settings are determined. In the examples above, a current frame and its current statistics and/or image capture settings may be known and may be used with the audio input and/or contextual information to determine image capture settings and/or adjustments. In some examples, however, when the camera application is initializing, the image capture settings may be determined independent of a current frame and its associated statistics and/or image capture settings.

Determining the one or more image capture settings upon initialization of the camera application may include determining the white balance gain based on the audio input and/or contextual information. Without having statistics associated with a current frame, device 400 may determine and/or select an initial illuminant based on the audio input and/or the contextual information. For example, if the audio input and/or the contextual information from the last 30 seconds of opening the camera application indicates that device 400 is inside, then indoor illuminants may be assigned higher weight values than outdoor illuminants. In some examples, additional information (e.g., the contextual information including metadata about the current state of device 400) may be used to further refine the illuminant selection. For example, whether it is daytime or nighttime may indicate whether any lights or lamps are being used as a light source. In this manner, the camera application may be initialized and an illuminant and/or white balance gains may initially be determined and applied when a first frame is received. Once the first frame is received, adjustments may be made based on the current statistics, as discussed above.

Determining the one or more image capture settings upon initialization of the camera application may include determining one or more exposure settings based on the audio input and/or contextual information. Without having statistics associated with a current frame, device 400 may determine and/or select initial exposure settings based on the audio input and/or the contextual information. For example, if the audio input and/or the contextual information from the last 30 seconds of opening the camera application indicates that device 400 is outside at nighttime, then device 400 may determine that its surrounding environment includes low light levels. In this example, the camera application may initialize with initial exposure settings such as a longer exposure time with a higher sensor gain and a lower digital gain than if the device were in a well-lit area. The one or more exposure settings may then be applied when capturing and/or receiving a first frame. Once the first frame is received, adjustments may be made based on the current statistics and current exposure settings, as discussed above.

Determining the one or more image capture settings upon initialization of the camera application may include determining an initial lens position based on the audio input and/or contextual information. If the audio input and/or the contextual information from the last 30 seconds of opening the camera application indicates that device 400 is outside, then device 400 may determine that the lens of camera 402 should be moved to a position for outdoor landscape photography (e.g., where objects may be farther away from the device 400 than objects in an indoor scene). In this example, the camera application may initialize with an initial lens position for outdoor landscape photography. Once the first frame is received, adjustments may be made based on how in-focus or out-of-focus the region of interest is. Alternatively, if the audio input and/or the contextual information from the last 30 seconds of opening the camera application indicates that device 400 is indoors, then device 400 may determine that the lens of camera 402 should be moved to a position for indoor photography (e.g., where objects may be closer to the device 400 than objects in an outdoor scene). In this example, the camera application may initialize with an initial lens position for an indoor scene. Once the first frame is received, adjustments may be made based on how in-focus or out-of-focus the region of interest is.

In some examples, determining the one or more image capture settings upon initialization of a camera application based on the audio input and/or the contextual information stored in the memory for a period of time may include determining the one or more image capture settings upon initialization of a camera application based on comparing the audio input and/or contextual information to one or more previously stored image capture settings from a previous image capturing session. For example, one or more image capture settings that were used in a previous image capturing session may be stored in memory. The camera application may have then been closed. Upon initialization of the camera application after it was closed, one or more image capture settings may be determined by comparing the audio input and/or the contextual information with the previously stored image capture settings to determine whether new settings, as discussed above, should be used upon initialization.

Certain aspects of this disclosure have been provided above. Some of these aspects may be applied independently and some of them may be applied in combination as would be apparent to those of skill in the art. In the foregoing description, for the purposes of explanation, specific details are set forth in order to provide a thorough understanding of embodiments of the invention. However, it will be apparent that various aspects may be practiced without these specific details. The figures and description are not intended to be restrictive. Rather, the ensuing description of the exemplary aspects will provide those skilled in the art with an enabling description for implementing an exemplary aspect. It should be understood that various changes may be made in the function and arrangement of elements without departing from the spirit and scope of the invention as set forth in the appended claims.

Specific details are given in the description to provide a thorough understanding of the different aspects of the disclosure. However, it will be understood by one of ordinary skill in the art that the examples described may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Moreover, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Further, the various illustrative logical blocks, modules, circuits, and algorithm steps described in connection with the embodiments disclosed herein may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A device, comprising:
 a memory;
 a camera including a lens and a sensor; and
 a processor coupled to the camera and the memory, the processor configured to:
  receive an audio input via a microphone prior to initializing a camera application of the device;
  determine contextual information based on the audio input prior to initializing the camera application, the contextual information being associated with at least one characteristic of a scene;
  initialize the camera application;
  determine one or more statistics of at least a current frame of the scene, the one or more statistics being associated with the at least one characteristic of the scene;
  determine a first weight value for a first type of the at least one characteristic of the scene and a second weight value for a second type of the at least one characteristic of the scene based on the one or more statistics of at least the current frame and most recent contextual information from the contextual information determined based on the audio input, the most recent contextual information being determined from the contextual information within a threshold period of time prior to initializing the camera application, wherein the first weight value is higher than the second weight value;

determine one or more image capture settings based on the first type of the at least one characteristic of the scene based on the first weight value being higher than the second weight value; and upon initialization of the camera application, output the one or more image capture settings.

2. The device of claim 1, wherein the contextual information includes context associated with an environment in which the device is located.

3. The device of claim 1, wherein the at least one characteristic of the scene includes one or more lighting conditions associated with the scene, the first type of the at least one characteristic includes a first type of lighting condition, and the second type of the at least one characteristic includes a second type of lighting condition.

4. The device of claim 1, wherein the contextual information includes metadata associated with a current state of the device.

5. The device of claim 1, wherein the contextual information includes one or more keywords identified in the audio input.

6. The device of claim 1, wherein the one or more image capture settings includes at least one of one or more exposure settings, a white balance gain, or a lens position.

7. The device of claim 6, wherein determining the one or more image capture settings includes determining the white balance gain, wherein determining the white balance gain includes:

determining the white balance gain based on the first weight value being higher than the second weight value.

8. The device of claim 7, wherein outputting the one or more image capture settings includes:

applying the white balance gain to one or more subsequent frames.

9. The device of claim 8, wherein the processor is further configured to:

output the one or more subsequent frames with the applied white balance gain for display.

10. The device of claim 1, wherein the one or more image capture settings include one or more exposure settings, and wherein the processor is further configured to:

apply the one or more exposure settings to one or more subsequent frames; and output the one or more subsequent frames with the applied one or more exposure settings for display.

11. The device of claim 1, wherein determining the one or more image capture settings includes determining a lens position based on the contextual information, wherein the lens position includes an initial lens position.

12. The device of claim 11, wherein the processor is further configured to:

cause the camera to move the lens of the camera from a current lens position to the determined lens position.

13. The device of claim 1, wherein at least one of the audio input or the contextual information are stored in the memory for a period of time.

14. The device of claim 13, wherein determining the one or more image capture settings includes determining the one or more image capture settings upon initialization of the camera application based on the audio input or the contextual information stored in the memory for the period of time.

15. The device of claim 14, wherein determining the one or more image capture settings upon initialization of the camera application includes determining a white balance gain based on the audio input or the contextual information.

16. The device of claim 14, wherein determining the one or more image capture settings upon initialization of the camera application includes determining one or more exposure settings based on the audio input or the contextual information.

17. The device of claim 14, wherein determining the one or more image capture settings upon initialization of the camera application includes determining an initial lens position based on the audio input or the contextual information.

18. The device of claim 1, wherein the processor is further configured to:

capture an image using the one or more image capture settings.

19. The device of claim 1, further comprising:

a display.

20. A method, comprising:

receiving, via a microphone included within a device, an audio input prior to initializing a camera application of the device;

determining, via the device, contextual information based on the audio input prior to initializing the camera application, the contextual information being associated with at least one characteristic of a scene;

initializing the camera application;

determining, via the device, one or more statistics of at least a current frame of the scene, the one or more statistics being associated with the at least one characteristic of the scene;

determining, via the device, a first weight value for a first type of the at least one characteristic of the scene and a second weight value for a second type of the at least one characteristic of the scene based on the one or more statistics of at least the current frame and most recent contextual information from the contextual information determined based on the audio input, the most recent contextual information being determined from the contextual information within a threshold period of time prior to initializing the camera application, wherein the first weight value is higher than the second weight value;

determining, via the device, one or more image capture settings based on the first type of the at least one characteristic of the scene based on the first weight value being higher than the second weight value; and upon initialization of the camera application, outputting, via the device, the one or more image capture settings.

21. The method of claim 20, wherein the contextual information includes context associated with an environment in which the device is located.

22. The method of claim 20, wherein the at least one characteristic of the scene includes one or more lighting conditions associated with the scene, the first type of the at least one characteristic includes a first type of lighting condition, and the second type of the at least one characteristic includes a second type of lighting condition.

23. The method of claim 20, wherein the contextual information includes metadata associated with a current state of the device.

24. The method of claim 20, wherein the contextual information includes one or more keywords identified in the audio input.

25. The method of claim 20, wherein the one or more image capture settings includes at least one of one or more exposure settings, a white balance gain, or a lens position.

26. The method of claim 25, wherein determining the one or more image capture settings includes determining the white balance gain, wherein determining the white balance gain includes:
determining the white balance gain based on the first weight value being higher than the second weight value.

27. The method of claim 26, wherein outputting the one or more image capture settings includes:
applying the white balance gain to one or more subsequent frames.

28. The method of claim 27, further comprising:
outputting the one or more subsequent frames with the applied white balance gain for display.

29. The method of claim 20, wherein the one or more image capture settings include one or more exposure settings, and further comprising:
applying the one or more exposure settings to one or more subsequent frames; and
outputting the one or more subsequent frames with the applied one or more exposure settings for display.

30. The method of claim 20, wherein determining the one or more image capture settings includes determining a lens position based on the contextual information, wherein the lens position includes an initial lens position.

31. The method of claim 30, further comprising:
causing a camera of the device to move a lens of the camera from a current lens position to the determined lens position.

32. The method of claim 20, wherein at least one of the audio input or the contextual information are stored in a memory for a period of time.

33. The method of claim 32, wherein determining the one or more image capture settings includes determining the one or more image capture settings upon initialization of the camera application based on the audio input or the contextual information stored in the memory for the period of time.

34. The method of claim 33, wherein determining the one or more image capture settings upon initialization of the camera application includes determining a white balance gain based on the audio input or the contextual information.

35. The method of claim 33, wherein determining the one or more image capture settings upon initialization of the camera application includes determining one or more exposure settings based on the audio input or the contextual information.

36. The method of claim 33, wherein determining the one or more image capture settings upon initialization of the camera application includes determining an initial lens position based on the audio input or the contextual information.

37. The method of claim 20, further comprising:
capturing an image using the one or more image capture settings.

38. The method of claim 20, wherein the device includes a display.

39. A non-transitory computer-readable storage medium storing instructions that, when executed, cause one or more processors of a device to:
receive an audio input via a microphone prior to initializing a camera application of the device;
determine contextual information based on the audio input prior to initializing the camera application, the contextual information being associated with at least one characteristic of a scene;
initialize the camera application;
determine one or more statistics of at least a current frame of the scene, the one or more statistics being associated with the at least one characteristic of the scene;
determine a first weight value for a first type of the at least one characteristic of the scene and a second weight value for a second type of the at least one characteristic of the scene based on the one or more statistics of at least the current frame and most recent contextual information from the contextual information determined based on the audio input, the most recent contextual information being determined from the contextual information within a threshold period of time prior to initializing the camera application, wherein the first weight value is higher than the second weight value;
determine one or more image capture settings based on the first type of the at least one characteristic of the scene based on the first weight value being higher than the second weight value; and
upon initialization of the camera application, output the one or more image capture settings.

40. The non-transitory computer-readable storage medium of claim 39, wherein the contextual information includes context associated with an environment in which the device is located.

41. The non-transitory computer-readable storage medium of claim 39, wherein the at least one characteristic of the scene includes one or more lighting conditions associated with the scene, the first type of the at least one characteristic includes a first type of lighting condition, and the second type of the at least one characteristic includes a second type of lighting condition.

42. The non-transitory computer-readable storage medium of claim 39, wherein the contextual information includes metadata associated with a current state of the device.

43. The non-transitory computer-readable storage medium of claim 39, wherein the contextual information includes one or more keywords identified in the audio input.

44. The non-transitory computer-readable storage medium of claim 39, wherein the one or more image capture settings includes at least one of one or more exposure settings, a white balance gain, or a lens position.

45. The non-transitory computer-readable storage medium of claim 44, wherein determining the one or more image capture settings includes determining the white balance gain, wherein determining the white balance gain includes:
determining the white balance gain based on the first weight value being higher than the second weight value.

46. The non-transitory computer-readable storage medium of claim 45, wherein the instructions further cause the one or more processors to:
apply the white balance gain to one or more subsequent frames.

47. The non-transitory computer-readable storage medium of claim 46, wherein the instructions further cause the one or more processors to:
output the one or more subsequent frames with the applied white balance gain for display.

48. The non-transitory computer-readable storage medium of claim 39, wherein the one or more image capture settings include one or more exposure settings, and wherein the instructions further cause the one or more processors to:
apply the one or more exposure settings to one or more subsequent frames; and output the one or more subsequent frames with the applied one or more exposure settings for display.

49. The non-transitory computer-readable storage medium of claim 39, wherein determining the one or more image capture settings includes determining a lens position based on the contextual information, wherein the lens position includes an initial lens position.

50. The non-transitory computer-readable storage medium of claim 49, wherein the instructions further cause the one or more processors to:
cause a camera of the device to move a lens of the camera from a current lens position to the determined lens position.

51. The non-transitory computer-readable storage medium of claim 39, wherein at least one of the audio input or the contextual information are stored in a memory for a period of time.

52. The non-transitory computer-readable storage medium of claim 51, wherein determining the one or more image capture settings includes determining the one or more image capture settings upon initialization of the camera application based on the audio input or the contextual information stored in the memory for the period of time.

53. The non-transitory computer-readable storage medium of claim 52, wherein determining the one or more image capture settings upon initialization of the camera application includes determining a white balance gain based on the audio input or the contextual information.

54. The non-transitory computer-readable storage medium of claim 52, wherein determining the one or more image capture settings upon initialization of the camera application includes determining one or more exposure settings based on the audio input or the contextual information.

55. The non-transitory computer-readable storage medium of claim 52, wherein determining the one or more image capture settings upon initialization of the camera application includes determining an initial lens position based on the audio input or the contextual information.

56. The non-transitory computer-readable storage medium of claim 39, wherein the instructions further cause the one or more processors to:
capture an image using the one or more image capture settings.

57. The non-transitory computer-readable storage medium of claim 39, wherein the device includes a display.

\* \* \* \* \*